Figure 1:
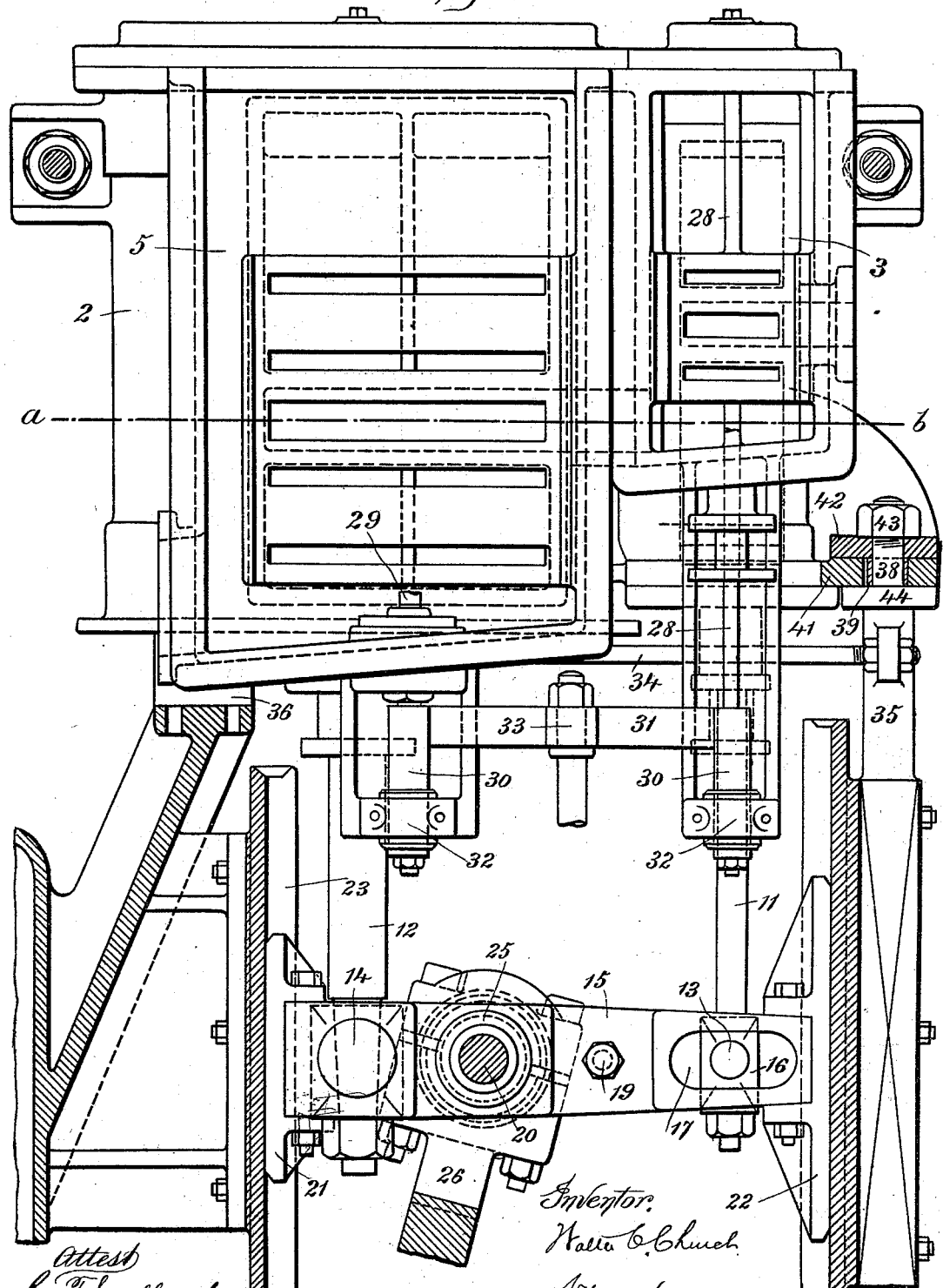

(No Model.) 9 Sheets—Sheet 1.

W. C. CHURCH.
STEAM ENGINE.

No. 519,239. Patented May 1, 1894.

(No Model.) 9 Sheets—Sheet 6.

W. C. CHURCH.
STEAM ENGINE.

No. 519,239. Patented May 1, 1894.

Attest:
Geo. T. Smallwood.
Reeve Lewis.

Inventor.
Walter C. Church
by Mont Mauro
his attorneys.

(No Model.) 9 Sheets—Sheet 7.
W. C. CHURCH.
STEAM ENGINE.
No. 519,239. Patented May 1, 1894.
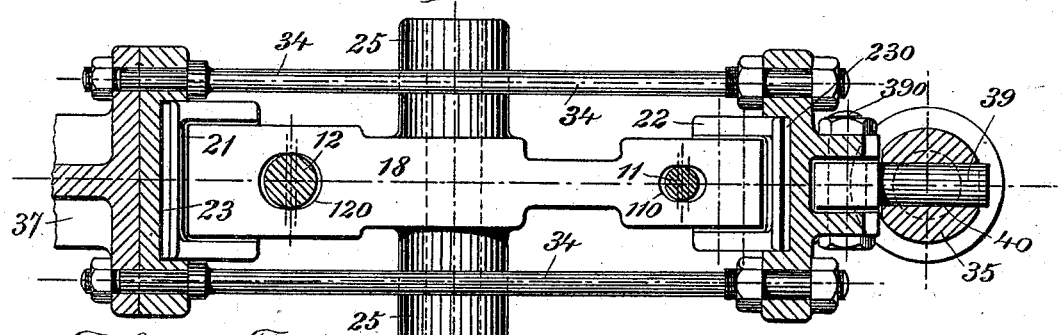

(No Model.) 9 Sheets—Sheet 8.
W. C. CHURCH.
STEAM ENGINE.
No. 519,239. Patented May 1, 1894.
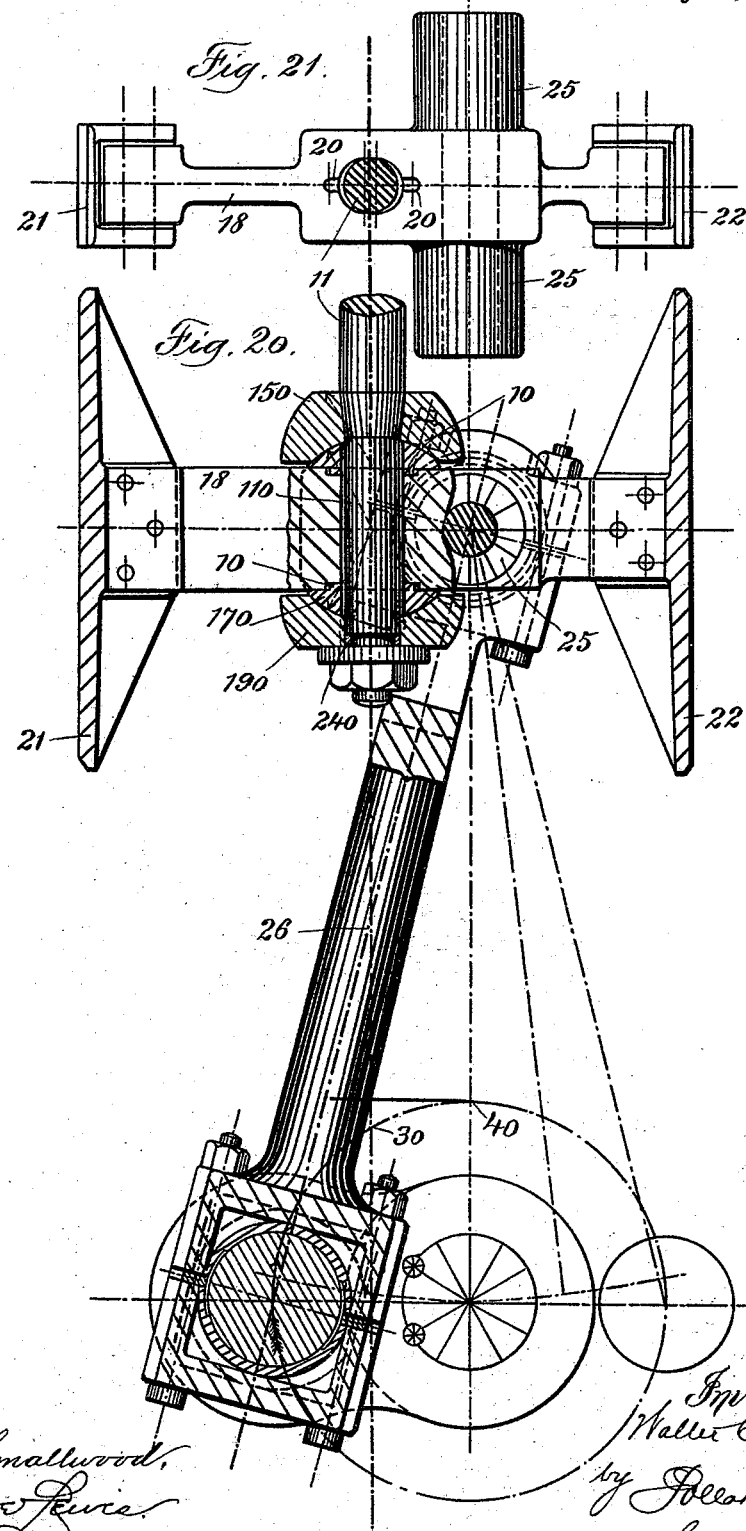

(No Model.)  9 Sheets—Sheet 9.
W. C. CHURCH.
STEAM ENGINE.
No. 519,239. Patented May 1, 1894.
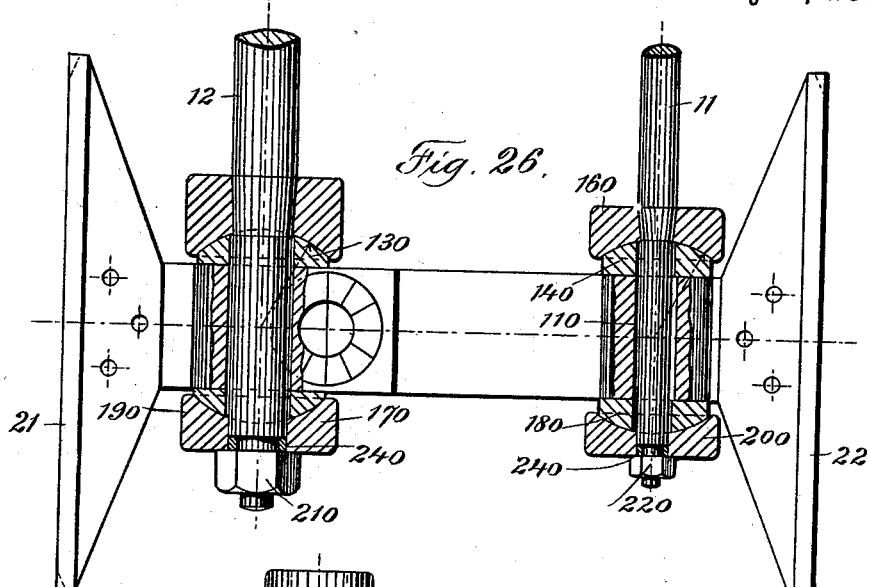
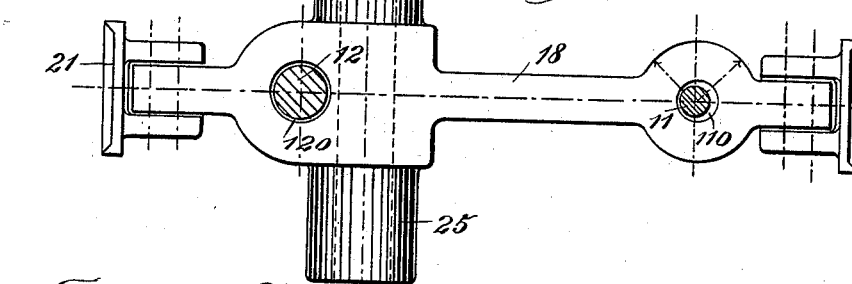
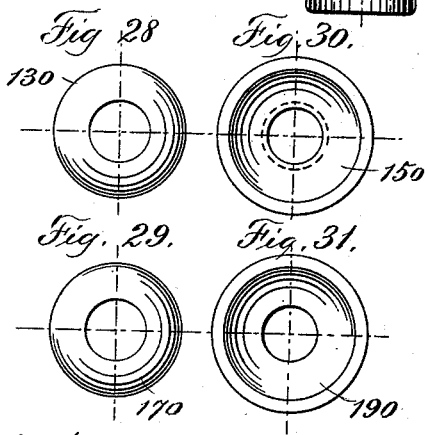
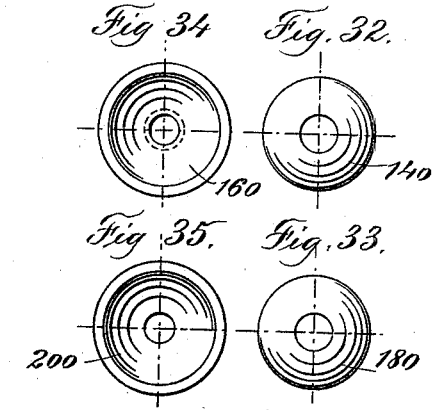
Attest.
Geo. T. Smallwood,
Inventor.
Walter C. Church
by Edward Mauro,
his attorney.

UNITED STATES PATENT OFFICE.

WALTER C. CHURCH, OF LONDON, ENGLAND.

STEAM-ENGINE.

SPECIFICATION forming part of Letters Patent No. 519,239, dated May 1, 1894.

Original application filed June 14, 1893, Serial No. 477,516. Divided and this application filed November 10, 1893. Serial No. 490,599. (No model.) Patented in England February 15, 1893, No. 3,396; in Italy June 30, 1893, No. 34,310; in Canada July 24, 1893, No. 43,718, and in Brazil August 11, 1893, No. 1,630.

*To all whom it may concern:*

Be it known that I, WALTER CHARLES CHURCH, engineer, a subject of the Queen of Great Britain and Ireland, residing at No. 6 Trinity Square, Brixton, London, in the county of Surrey, England, have invented certain Improvements in or Connected with Steam-Engines, (for which I have obtained patents in Great Britain, No. 3,396, dated February 15, 1893; in Italy, No. 34,310, dated June 30, 1893; in Canada, No. 43,718, dated July 24, 1893, and in Brazil, No. 1,630, dated August 11, 1893,) of which the following is a specification.

This application is a division and continuation of my application filed June 14, 1893, Serial No. 477,516.

The present invention has reference to the construction of cross-heads for steam and other motive fluid engines, and embraces certain improvements in the cross-heads themselves and in the connections thereof with the piston rod or rods on the one hand and the crank shaft on the other. These improvements are for the most part specially useful in compound or multiple-cylinder engines having two or more piston rods connected with the same cross-head, but (as will appear from the following description) some of the improvements may be used to advantage in engines having a single cylinder. For the purpose of preventing strain on the piston-rods by the expansion and contraction of the cylinders, the piston rods (or one of them) are (or is) connected to the cross-head in such manner as to admit of a limited lateral movement of the rods. This connection may be effected in several ways. For example, the end of the piston rod may be connected to a block which can slide in ways formed in the cross-head, when the latter is made of two cheeks or slabs, as hereinafter described. If the cross-head be solid, the piston rod may be passed through a hole of sufficiently large diameter to admit of the desired movement. This hole may be oblong in cross-section, so as to admit of movement in one direction only, or it may be of such size and shape as to admit of motion in every direction.

According to the present invention provision is also made to prevent lateral strain on the piston rods and the glands in which they work in case of tilting of the cross-head, the rod or rods being connected to the cross-head by a joint or flexible connection. This joint may be formed by a collar on the piston rod, on one side of the cross-head, and a washer and nut on the other, the bearing surfaces of the collar and washer being curved or concaved, and fitted to corresponding convexed-bearing surfaces on the cross-head. Obviously these convexed pieces may be arranged to slide on the cross-head for the purpose of permitting expansion and contraction of the cylinders as explained above. The contact faces may be spherical and cup-shaped respectively (instead of surfaces of single curvature) for the purpose of allowing rocking motion in any direction. In other words, the connection may be in the nature of a ball and socket, or universal joint. The desired play or flexibility may be effected by recessing the holding nuts and interposing packing rings, or by connecting the end of the piston rod, to the sliding blocks above referred to by bosses journaled in said blocks. Several improvements in details in this part of the invention will be hereinafter described.

The piston rods are connected to the cross-heads according to the relative diameters of their respective cylinders, and the connecting rod is attached to the cross-head preferably in such manner as to reduce the friction between the slippers of the cross-head and their guides.

When three cylinders are arranged side by side, and the three piston rods are connected to a crosshead arranged parallel to the crank shaft, the connecting rod may be attached to the crosshead in line with the piston rod of the central cylinder and with the center of the crank shaft, but in this case the friction between the slippers and their guides due to the angle of the connecting rod, will not be reduced. By attaching one or more of the piston rods to an arm or projection or arms or projections, on one side of the crosshead, the friction between the slippers and their guides, due to the angle of the connecting rod will be reduced and the power of the engine increased.

When three cylinders are arranged in a line at right angles to the crank shaft, the connecting rod may be attached to the crosshead in line with the piston rod of the central cylinder, and with the center of the crank shaft. By making the two outer cylinders of different diameters, the friction due to the angle of the connecting rod between the slipper and its guide at that end of the crosshead to which the piston rod of the larger of the two cylinders is attached is reduced, and consequently the power of the engine increased as before.

The piston rod or the low or lower pressure cylinder may be attached to the crosshead at a point such that, when the crank is at right angles to the line of motion of the pistons and consequently the connecting rod is at its greatest angle, the distance between the centers of connection of the piston rod and the connection rod with the crosshead will be such as to nearly equalize the power on both ends of the crosshead, or so as to give the greater power exerted by the low or lower pressure piston over that of the piston of the high pressure cylinder, as to relieve the friction between the slipper or slippers and their guides, the position of the connecting points being varied according to the differences of pressure and diameters of the cylinders. By this means a shorter connecting rod than hitherto may be used. This arrangement may be applied, not only to engines with two cylinders, but also to single cylinder engines, or to engines with a larger number of cylinders than two, to relieve or reduce the friction between the crosshead and its guides.

To maintain the guides between which the cross-head works parallel to each other the cylinders are so mounted and connected to said guides that the former are free to expand and contract without disturbing the relative positions of the latter, as will be hereinafter explained in detail.

The attachment of the valve rods to their crosshead may be similarly effected to accommodate the movement under expansion of the cylinders, or the said crosshead itself may be made so that it will slide telescopically to accommodate this movement, and may be provided with long bosses or arms fitted to slide in guides suitably arranged to insure the rods working truly.

The piston rod of the high pressure cylinder, and the piston rod of the low or lower pressure cylinder are connected to a crosshead in such a manner as to admit of more power being exerted on the crosshead at one end than at the other end, without straining or laterally distorting the piston rods. With this object the high pressure piston rod may be connected to a gudgeon provided with trunnions free to turn in blocks fitted to slide in slots in the crosshead, or the trunnions may be formed on the piston rod itself. The piston rod of the low or lower pressure cylinder may also be connected to a gudgeon with trunnions, or have trunnions formed thereon which fit so as to be free to turn, when required, in holes in the crosshead.

Two or more sets of cylinders such as herein described may be arranged to work several cranks on one shaft.

The invention includes other new features of construction and combinations of parts as will be hereinafter explained.

I will describe my invention with reference to the accompanying drawings, as applied to a compound steam engine such as described in my application filed June 14, 1893, Serial No. 477,516, containing one high pressure cylinder and one low pressure cylinder, it being understood, however, that the invention is also applicable to engines containing more than two cylinders and partly to single-cylinder engines.

Figure 2:
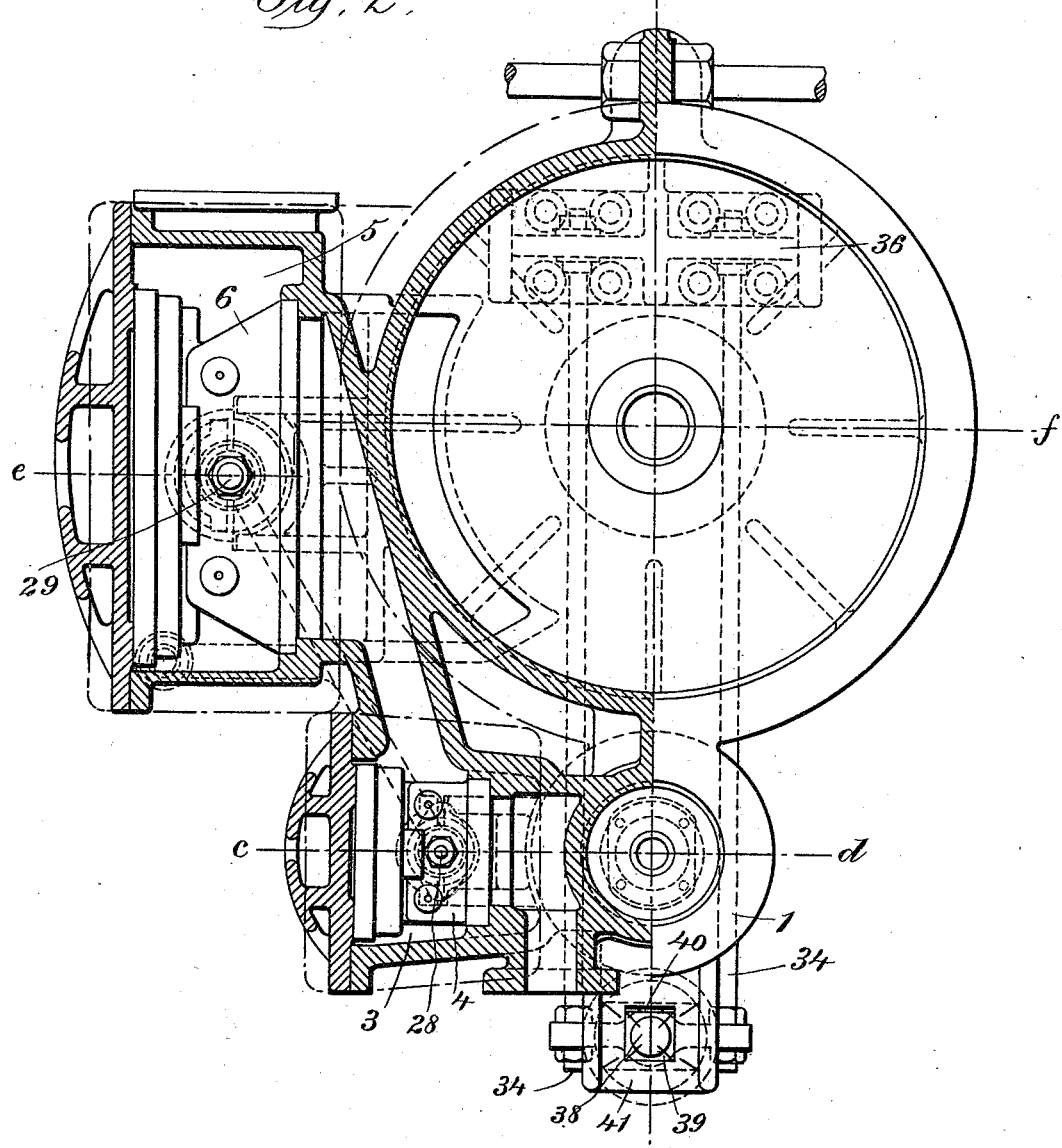
Figure 3:
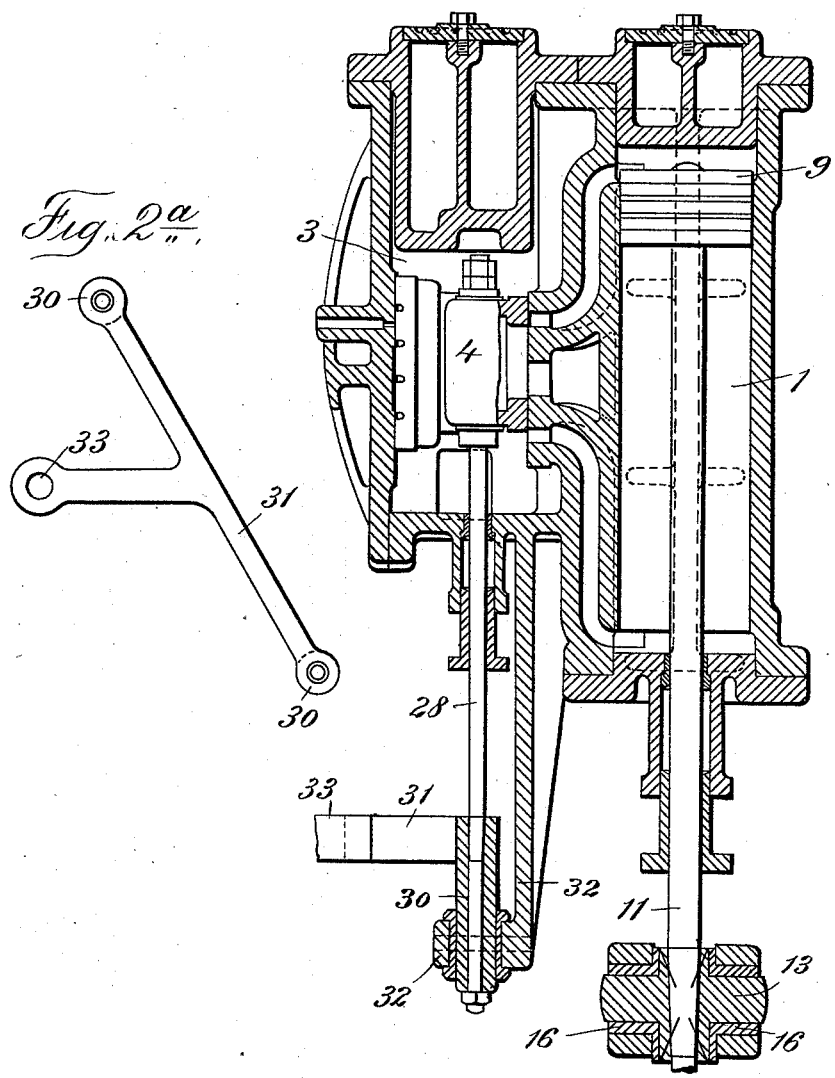
Figure 4:
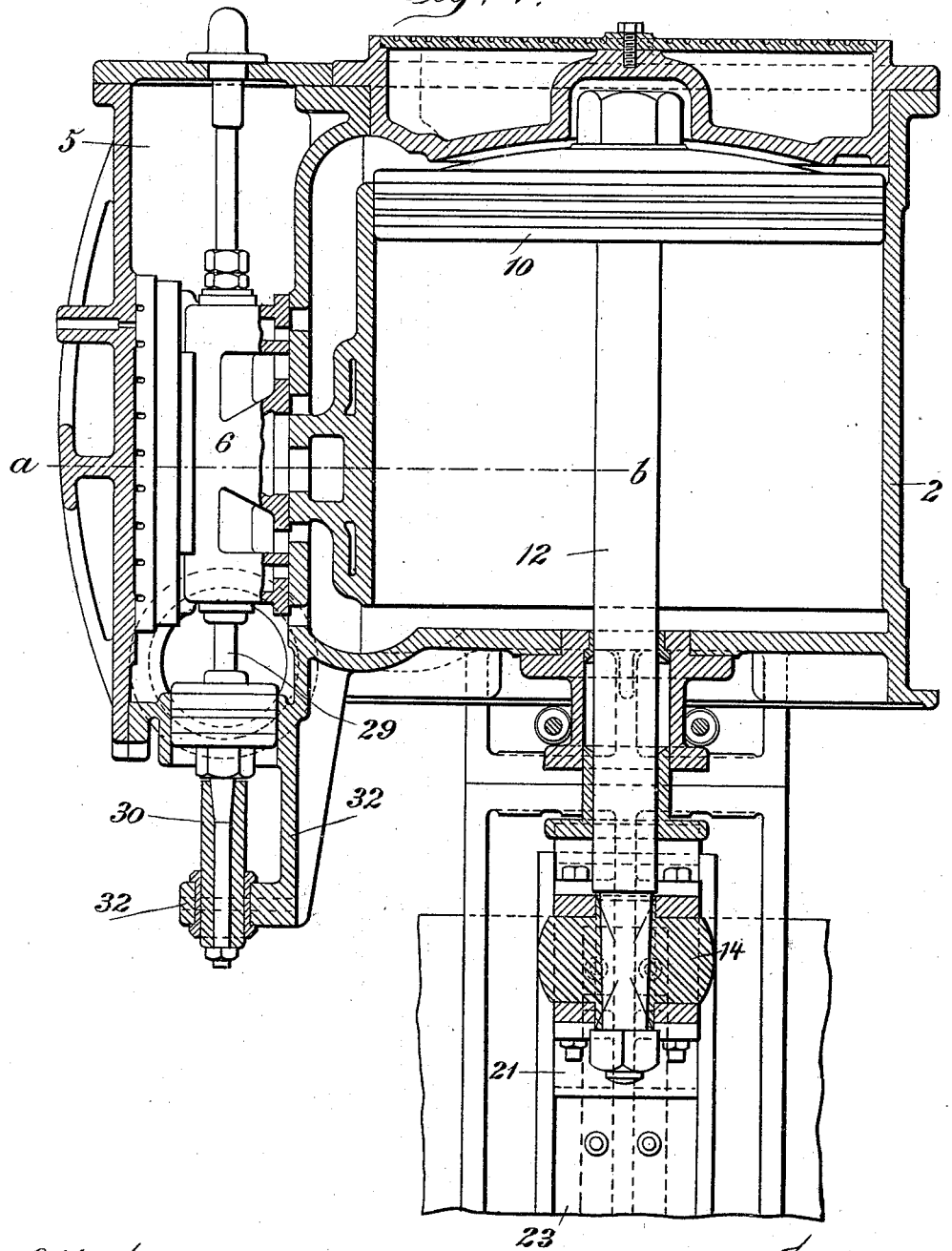
Figure 5:
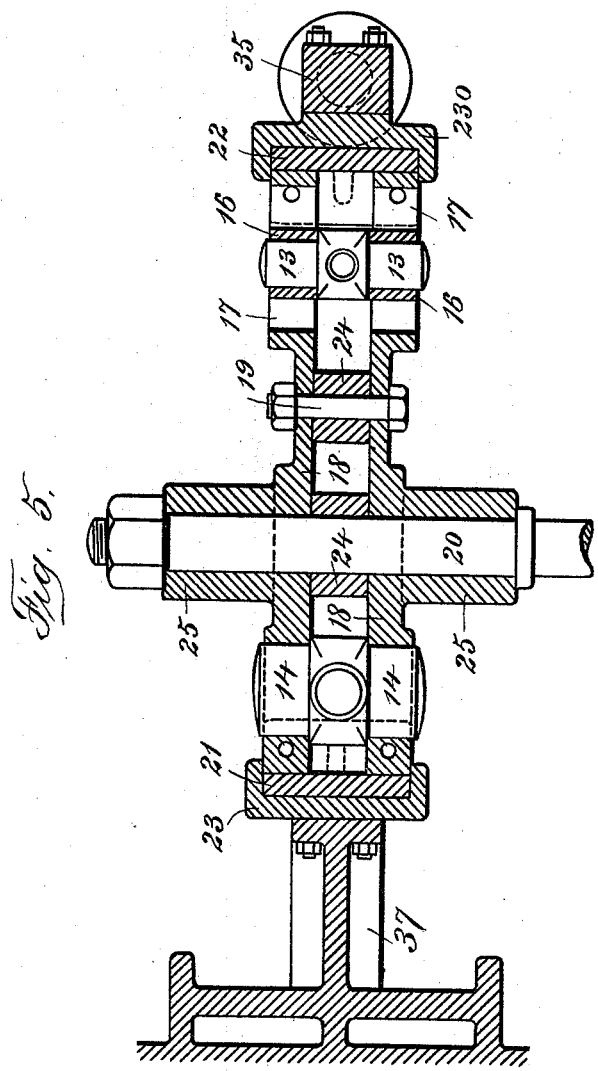
Figure 6:
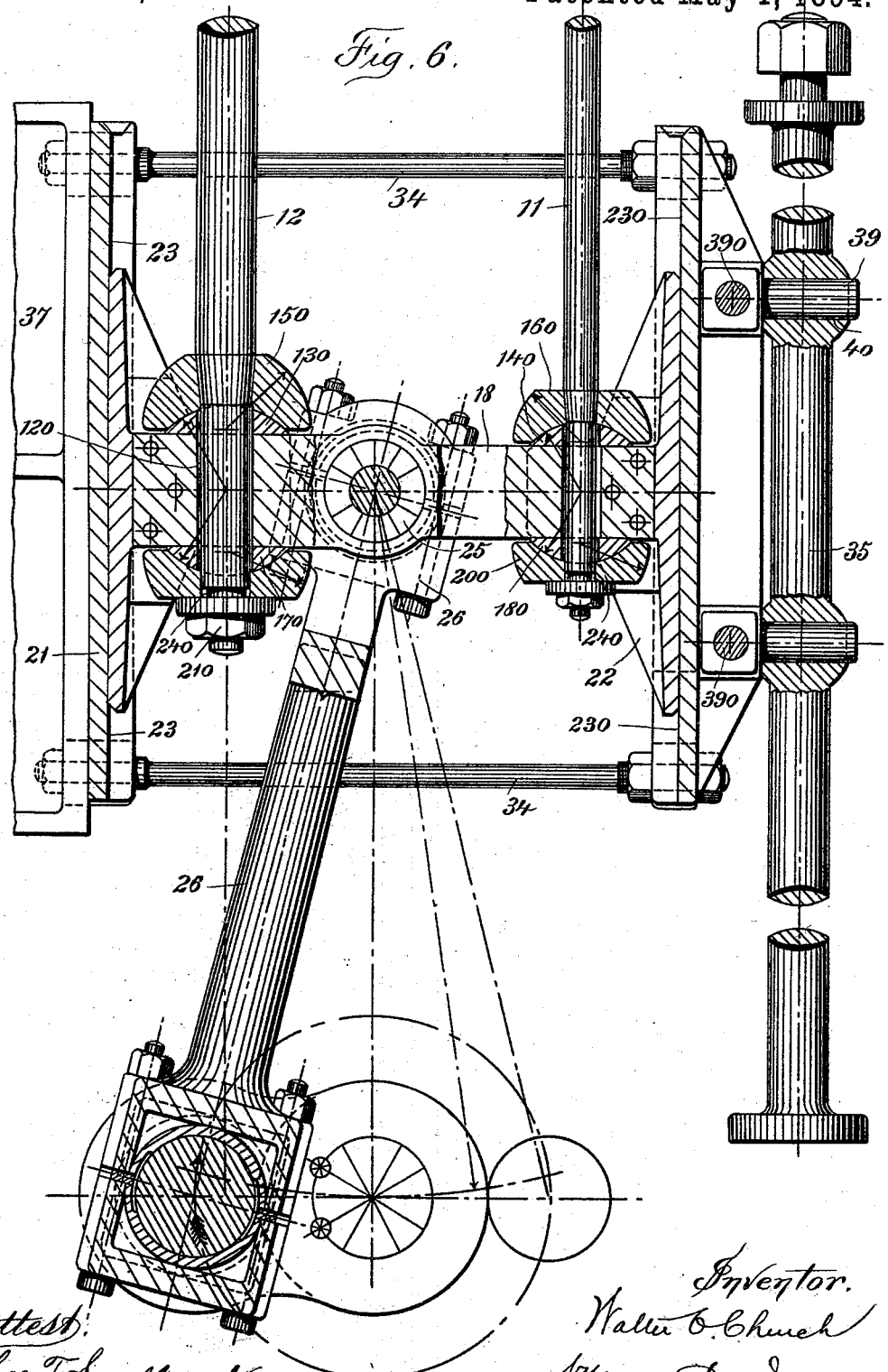

Figure 1 of the drawings represents in elevation partly in section a compound high and low pressure engine, to which my invention is applied the covers of the valve chests being removed. Fig. 2 is a part plan, and part horizontal section taken along the line $a$—$b$, Figs. 1 and 4. Fig. $2^a$ is a detail of the crosshead for the valve rods. Fig. 3 is a vertical section of the high pressure cylinder and its valve chest, the section being taken along the line $c$—$d$ in Fig. 2. Fig. 4 is a vertical section of the low pressure cylinder and its valve chest, the section being taken along the line $e$—$f$, Fig. 2. Fig. 5 is a horizontal section of the crosshead shown in Figs. 1, 3 and 4, to which the high and low pressure piston rods are connected. Fig. 6 is a vertical section, and Fig. 7 a plan of a modified construction of the crosshead, showing my improved method of connecting the piston rods thereto, for preventing undue lateral strain on the piston rods by the expansion and contraction of the cylinders. Fig. 8 is a top view of a convex piece fitted to slide on the top of the crosshead and through which the rod of the low pressure piston passes. Fig. 9 is a similar view of a corresponding convex piece fitted to slide on the under surface of the crosshead. Fig. 10 is the concave piece or collar carried on the piston rod, and which fits the convex piece Fig. 8, and Fig. 11 is a concave piece or washer fitting the convex piece Fig. 9. The low pressure piston rod passes through these pieces and through an elongated hole in the crosshead, and is secured thereto by a nut or nuts. Figs. 12, 13, 14 and 15 are pieces (similar to the pieces 8, 9, 10 and 11) through which the high pressure piston rod passes, and to which it is secured by a nut or nuts. Figs. 16 and 17 show in section and plan respectively a portion of a crosshead, having convex projections formed thereon instead of being free to slide thereon, as in the arrangements illustrated by Figs. 6 to 15, and Figs. 18 and 19 are exterior views of the concave pieces which fit the top and bottom convex surfaces respectively on the crosshead. Figs. 20 and 21 represent respectively in sectional elevation and plan a crosshead for a single-cylinder engine, showing my improved mode of connecting the piston-rod and crank connecting rod thereto. Figs. 22 and 23 are views of the inner sides of the top and bottom convex piece respectively, fitted to slide on the crosshead, and Figs. 24 and 25 are views of the inner sides of the top and bottom concave pieces which fit on to the convex pieces Figs. 22 and 23. Figs. 26 and 27 represent in sectional elevation and plan respectively a crosshead for compound engines, having spherical convex surfaces, and corresponding cup-shaped concave pieces fitted thereon, so as to form universal joints between the piston rods and the crosshead. Figs. 28 and 29 are exterior views of the top and bottom spherical pieces, through which the low pressure piston rod passes, and Figs. 30 and 31 are interior views of the corresponding cup-shaped concave pieces which fit thereon. Figs. 32 and 33 are the spherical convex pieces through which the high-pressure piston rod passes, and Figs. 34 and 35 are the corresponding cup-shaped concave pieces which fit thereon. Figs. 36, 37 and 38 are respectively a longitudinal sectional elevation, a sectional plan, and an end elevation of a crosshead constructed according to my invention, to which the valve rods of a compound engine are connected, the said crosshead admitting of the movement of the cylinders by expansion and contraction of the metal thereof without bending or distorting the said valve rods.

Referring to Figs. 1, 2, 3 and 4, 1 is the high pressure cylinder, and 2 is the lower pressure cylinder. These cylinders are arranged side by side or parallel to each other, and may be cast together as shown, or they may be each cast separately, and be connected together by any suitable means. The lower pressure cylinder is of such considerably greater diameter than the high pressure cylinder as to utilize, as far as practicable, the pressure of the steam which passes directly into it from the high pressure cylinder, as described in my application heretofore referred to.

3 is the chest or casing containing the high pressure slide valve 4, and 5 is the chest or casing containing the valve 6 of the lower pressure cylinder. The pistons 9 and 10 of the high and the lower pressure cylinders are connected by their rods 11 and 12 to gudgeons 13 and 14 mounted in the crosshead 15, or the said gudgeons or trunnions may be formed on the piston rods themselves if desired. The trunnions of the high pressure piston rod are fitted into blocks 16 which can slide in slots 17 in the crosshead to prevent any undue lateral strain on the piston rod or rods by the expansion and contraction of the cylinders. This crosshead may consist of a solid bar, having the piston rods and also the connecting rod connected thereto, as shown in Figs. 6, 7, 16, 17, 20, 21, 26 and 27, and hereinafter described, or the said crosshead may be constructed as shown in Figs. 1 and 5 of two sides or cheeks 18 connected together between their opposite ends by bolts 19 and 20 and also at their ends by slippers 21, 22 which constitute the guiding surfaces to slide in the guides 23, 230, distance pieces 24 being interposed between the sides or cheeks 18 to maintain them at the required distance apart. The bolt 20 passes through bosses 25, formed on the sides or cheeks 18 of the crosshead, which bosses constitute the journals to which the forked end of the connecting rod 26 is connected. This bolt 20 may be prolonged in either or both directions and be utilized for driving pumps or the like. The positions of the journals, with reference to the points of connection of the piston rods to the crosshead, are arranged according to the difference in the comparative diameters of the cylinders and also to the differences of pressure exerted on the pistons, so that when the crank is at a quarter stroke, that is, at right angles to the line of motion of the pistons, and the connecting rod is at its greatest angle, as shown in Figs. 1 and 6 (partly broken away in Fig. 1), the leverage between the journals or trunnions 25 and the center of the low or lower pressure piston rod 12 is such as to give greater power on that end of the crosshead, and thereby counteract the strain thrown by the angle of the connecting rod on the slipper 21 against the guide 23 at that end of the crosshead when the pistons are making their inward stroke and the crank is rotating in the direction indicated by the arrow on the crank pin in Fig. 6. If the crank is arranged to turn in the opposite direction to that indicated by the arrow, it is obvious that the positions of the piston rods with reference to the journals or trunnions 25 will be reversed. The length of the slippers 21, 22 will be governed by the difference of power exerted on the crosshead on opposite sides of the journals or trunnions 25, the length of the slippers being increased according to the excess of power exerted on one end of the crosshead over that exerted on the opposite end thereof, to act as leverage to maintain the crosshead in position at about right angles to the piston rod, and thereby reduce the friction between the slippers and their guides and give increased power to the engine. The arrangement illustrated in Figs. 20 and 21 shows this part of my invention as applied to a crosshead having a single piston rod connected thereto, from which it will be readily understood that similar actions will take place with crossheads having two or more piston rods connected thereto. The piston rod 11 is shown in this example as being connected to the crosshead at a point midway between the center of the shaft and the center of the crank pin, when the crank is at right angles to the line of motion of the piston, and the connecting rod is at its greatest angle. The leverage provided between the center of the journals or trunnions 25 and the center of the piston rod will reduce the friction between the slipper 21 and its guide about fifty per cent. from what it would be if the piston rod be connected in the usual manner in line with the center of the journals or trunnions 25. It is, therefore, obvious that a shorter connecting rod can be used than heretofore, without loss of power by increased friction on the slippers and their guides. When the center of the crank pin arrives at the point 30, in the circle representing the traverse of the center of the crank pin, it is then in line with the center of the piston rod 11; the angle of the connecting rod has no tendency to force the slipper 21 against its guide, and consequently, the friction is reduced to a minimum. While the crank pin is moving from the point 30 to the point 40 the exhaust port will be opened, and consequently there is very little or no power exerted on the crosshead, while the piston is completing its inward stroke. When the piston commences its inward stroke, that end of the slipper 21 which is nearest to the crank, and that end of the slipper 22 which is farthest from the crank, are caused to bear against their guides with greater pressure than at their opposite ends, which opposite ends are slightly removed from their guides and will allow lubricant to pass between the slipper 21 and its guide. When the piston commences its outward stroke this is reversed, that end of the slipper 21 which is farthest from the crank and that end of the slipper 22 which is nearest the crank, being caused to bear against their guides with greater pressure than at their opposite ends, which opposite ends are slightly removed from their guides, and will admit of lubricant passing between the slipper 22 and its guide. The slippers and their guides are thus maintained thoroughly lubricated. The distance of the center of the piston rod from the journals or trunnions 25 may be varied, but it should be connected to the crosshead at a point between the center of the crank pin and the center of the shaft when the crank is at right angles to the direction of motion of the piston, and the piston is moving inward.

To prevent the distance between the working faces of the guides 23, 230 from being affected by the expansion and contraction of the cylinders, I connect by the bolt or rods 34 (see Figs. 1 and 2) the column or frame 35 to which the guide 230 is attached to a foot 36 to which the framing or column 37 carrying the other guide 23 is attached. The column 35 is provided with a stud 38, which passes through a block 39 fitted in a slot 40 formed in a lug or bracket 41 on the high pressure cylinder, which block 39 forms a distance piece, on which a plate or washer 42 is forced by a nut 43 or otherwise (by a collar, for example) so as to allow freedom for the movement of the lug 41 between the plate or washer 42 and a flange or cotter 44 on the column or frame 35 to allow the cylinder to expand and contract under changes of temperature without affecting the position of the guides 23, 230.

The crosshead illustrated in Figs. 6 and 7 consists of a solid bar 18, having bosses or trunnions 25 formed thereon, to which the upper forked end of the connecting rod 26 is secured. To the ends of the bar 18 are fixed the slippers 21, 22 which slide in guides 23, 230. These guides, as shown in this arrangement, are connected together, and to one of the frames or columns 37 which support the cylinders, by the rods 34 so as to maintain the said guides rigid and parallel or at a uniform distance apart, and maintain a working fit between the slippers and the guides. The guide 230 is connected to the column 35 by studs 39 attached to the guide by bolts 390, these studs being fitted to slide in holes 40 in the column, so as to admit of the cylinders (to which the column 35 is attached), expanding and contracting without distorting the guides.

To permit of the expansion and contraction of the cylinders without laterally distorting rods 12 and 11, there are provided near the opposite ends of the crosshead 18 elongated vertical holes 110, 120, through which the lower ends of the piston rods pass. On the piston rods 11 and 12 respectively are fitted, as shown in Fig. 6, concave collars 150, 160 which fit and are free to rock on correspondingly convexed pieces 130, 140, fitted to slide on the top of the crosshead, these convex pieces being provided with elongated holes corresponding to the holes 110, 120, in the crosshead through which the high and low piston rods respectively pass. On the under side of the crosshead are convexed pieces 170, 180, with which engage concaved washers 190, 200, secured by nuts 210, 220 to the lower projecting ends of the piston rods. The ends of the piston rods on which the nuts 210, 220 screw are reduced in diameter so as to form shoulders, between which shoulders and the nuts may be interposed, as shown in Fig. 6, collars 240, to prevent the concaved washers and collars from being jammed too tightly against the convexed pieces, thereby leaving the said convexed pieces free to slide automatically on the crosshead to accommodate any movement of the piston rods owing to expansion of the cylinders, and also to prevent lateral strain on the piston rods should the crosshead be depressed more at one end than at the other end. The collars and washers being free to rock on the convexed pieces 130, 140, 170, 180 prevent the cylinders from being worn oval on the sides at right angles or transverse to the shaft by the pistons being pressed more on one side than on the other during their strokes, or the nuts may be recessed on their faces adjacent to the washers to receive packing rings or distance pieces for this purpose. When any expansion or contraction of the metal of the cylinders takes place, one or other or both of the piston rods will be caused to slide in the elongated hole or holes in the crosshead, the convexed piece at the same time moving on the crosshead by the engagement therewith of the concaved collars and washers on the piston rods, and thereby prevent any distortion of the piston rods or the glands in which they work. Instead of the convexed pieces 130, 140, 170, 180, being free to slide on the crosshead as hereinbefore described, those in connection with the piston rod nearest the fixed column or frame 37 may be formed on the crosshead, as shown in Figs. 16 and 17. A concave collar 150 is fixed on the piston rod 11 to bear on the upper convex piece 130, and a concave washer 190 caused to bear against the convex piece 170 on the under side on the crosshead by a nut 210 as before described. When the convex pieces are fitted to slide on the crosshead as hereinbefore described, they may be provided on their under sides with lugs or projections 10 which enter slots or recesses 20 in the crosshead, as shown in Figs. 20 and 21 as applied to a single-cylinder engine, which lugs or projections admit of the convex pieces moving in a longitudinal direction on the crosshead, but prevent them from turning. By connecting the piston rod of a single-cylinder engine to the crosshead in the manner described, should the crosshead be depressed more on one end than on the opposite end, the piston rod and its gland in which it works will not be distorted, and the friction between the slipper 21 and its guide, due to the angle of the connecting rod when the piston is making its inward stroke, will be reduced, it also prevents the cylinder from being worn oval, as hereinbefore described with reference to Figs. 6 and 7. The convexed pieces 130, 140, 170, 180, Figs. 6, 7, 16, 17, 20 and 21, may be of spherical form, and the concaved collars 150, 160 and washers 190, 200, engaging therewith cup-shaped as shown in Figs. 26 to 35 of the drawings, so that the connections of the piston rods to the crosshead are similar to ball and socket joints, and permit of the expansion and contraction of the metal of the cylinders in any direction without distorting the piston rods, and also admit of the piston or pistons turning in its or their cylinder or cylinders during its or their strokes, and thus prevent the internal diameters of the cylinders and the guides in which the piston rods work and also the piston rod from being worn oval or from being worn into grooves. In this arrangement the holes in the crosshead 18 and also in the spherical pieces 130, 140, 170, 180 through which the piston rods pass are circular instead of being elongated as hereinbefore described, so as to admit of the said rods moving in any direction. Should the crosshead be depressed more at one end than at the opposite end, or should the cylinder or cylinders be slightly out of line, the universal connection thus provided prevents any lateral strain on the piston rod or rods or on or in the glands in which they work.

The spindles 28 and 29 of the valves 4 and 6 are connected to sleeves or arms 30 formed on the opposite ends of the crosshead 31, shown detached in Fig. 2ª which sleeves or arms are fitted to slide in guides 32, shown in Figs. 1, 3 and 4, as being cast on the valve boxes 3 and 5, but which may be attached thereto or to any other suitable part of the engine. This crosshead is connected at 33 to the mechanism by which the valves are worked, and may be made in one piece, as shown in Fig. 2ª; but in order to accommodate the movement of the cylinders under expansion and contraction, I construct this crosshead in parts, as shown in Figs. 36, 37, and 38 the part 31 being fitted to slide in the part 310, a cotter or key 300 being passed through the part 310 and through a slot or elongated hole in the part 31 to allow of the elongation of the crosshead by the expansion of the cylinders, and at the same time maintain the arms 30 parallel one to the other when the engine is at work.

What I claim is—

1. In a steam or other fluid-pressure engine, the combination with the cross-head, of a piston rod having a connection therewith which allows the point of connection of the piston rod automatically to shift its position with respect to the cross-head during the running of the engine, substantially as described.

2. The combination with the cross-head, of a piston rod and a block or piece to which the end of said rod is secured, said block or piece being free to slide in or upon the cross-head, in a direction lengthwise thereof substantially as described.

3. In a compound or multiple-cylinder engine, the combination with the piston rods of a single cross-head to which all of said rods are connected, said rods being attached to said cross-head by movable connections so as to admit of motion of the rods toward, and from each other upon the contraction and expansion of the cylinders, substantially as described.

4. The combination with the cross-head, of a piston rod and a block or piece to which the end of said rod is jointed or flexibly connected, so as to be capable of a rocking movement with respect thereto, said block or piece being free to slide in or upon the cross-head, substantially as described.

5. The combination with the cross-head composed of slabs or cheeks connected together to form ways or spaces between them, of a block or blocks mounted to slide between said slabs or cheeks, and a piston rod or rods connected to said block or blocks, substantially as described.

6. The combination with the cross-head, of a piston rod having concaved contact surfaces, and correspondingly convexed bearing surfaces carried by said cross-head, and movable in or upon the same substantially as described.

7. The combination with the cross-head having spherical bearing surfaces movable in or upon the same, of a piston rod having corresponding cup-shaped contact surfaces, constituting a universal connection between the rod and cross-head, substantially as described.

8. In a steam or other fluid pressure engine in which the cylinder or cylinders is or are subject to movement under changes of temperature, the combination of the supports, the guides carried by said supports, and the cross-head moving in said guides, the cylinder or cylinders being connected to said supports by a sliding connection, substantially as described.

9. The combination with the parallel guides rigidly connected together, of the cross-head working in said guides, and the cylinder or cylinders connected thereto by means which allow expansion and contraction of the metal without affecting the parallelism of the guides, substantially as described.

10. The combination with the cross-head, the crank-shaft and the connection rod, of a piston-rod connected to the cross-head at a point between the end of the cross-head and the point where the connection rod is attached to the cross-head, substantially as described.

11. In a compound or multiple cylinder engine, the combination with the valve rods of a single crosshead to which all of said rods are connected said crosshead being made in parts connected together telescopically, so as to be capable of varying its length to accommodate movements of the cylinders, substantially as described.

12. In a compound or multiple cylinder engine, the combination with the valve rods, of a cross-head to which all of said rods are connected, said cross-head being provided with long bosses sliding in guides, substantially as described.

In testimony whereof I have signed my name to this specification in the presence of two subscribing witnesses.

W. C. CHURCH.

Witnesses:
 EDWD. GEO. DAVIES,
47 *Lincoln's Inn Fields, London, W. C.*
 RUDOLPH CHAS. NICKOL,
31 *Lombard Street, London, E. C.*